tent Office 3,230,111
Patented Jan. 18, 1966

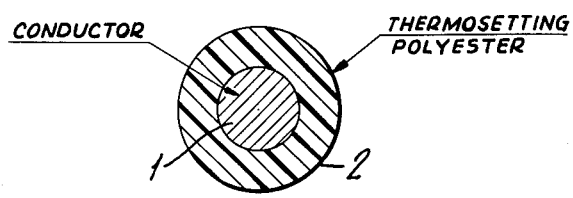

3,230,111
POLYESTER-INSULATED MAGNET WIRE AND
METHOD OF MAKING SAME
Ralph W. Hall, Earl L. Smith, and Ernest C. Koerner,
Fort Wayne, Ind., assignors to Phelps Dodge Copper
Products Corporation, Fort Wayne, Ind., a corporation
of Delaware
Filed July 7, 1961, Ser. No. 122,527
15 Claims. (Cl. 117—232)

This application is a continuation-in-part of copending application Serial No. 62,235 filed October 12, 1960, now Patent No. 3,022,200.

This invention relates to the production of magnet wire insulated with a thermosetting polyester resin. It has particular reference to an improved method of curing the polyester resin on the wire and to the product of such method.

During recent years there has been an increasing use of thermosetting polyester resins for magnet wire. These resins are of various forms but commonly consist essentially of the reaction product of a polyhydric alcohol, a glycol and a dicarboxylic acid or a lower alkyl ester of such an acid. These resins have shown remarkable thermal stability and they are readily soluble in organic solvents and thus can be applied to bare copper or aluminum wire by conventional coating methods using wiping dies followed by curing at a high temperature (550 to 1000° F.). The resin solution is generally applied in multiple coats each cured before application of the next.

Examples of polyester resins of the type described, which have been used to advantage for magnet wire insulation, are:

(1) An ester of terephthalic or isophthalic acid reacted with glycerine and/or pentaerythritol plus small quantities of silanes or siloxanes, and (2) Esters of terephthalic or isophthalic acid reacted with:
 (a) glycerine or pentaerythritol and
 (b) ethylene glycol or butane diol 1,4 or a mixture thereof.

These various polyesters are disclosed in United States Patents 2,686,739 dated August 17, 1954; 2,686,740 dated August 17, 1954; 2,889,304 dated June 2, 1959; and 2,936,296 dated May 10, 1960.

Certain modified polyester resins of the thermosetting type have also been so used. These are produced by adding to the dihydric and polyhydric alcohol-terephthalic acid polyester in essentially linear form a substantial proportion of another reactant, such as an isocyanate of the more thermally stable type, which serves as the predominant cross-linking agent in curing the resin on the conductor. One such isocyanate commonly used for this purpose is the trimer of a trisubstituted phenol or cresol blocked cyanuric acid (such Mondur SH, a product of Mobay Chemical Company, Pittsburgh, Pennsylvania) having the following structural formula:

These isocyanate resins, such as Mondur SH, tend to improve thermal stability, slightly reduce heat and solvent shock and, because of their active cross-linking, harden and toughen the finished film as well as improve its electrical properties.

These commonly used prior resins (the curing rates of which, as well as other thermosetting polyesters, are increased according to the present invention) can be described as thermosetting polyesters or modified polyesters which are either (a) the cured reaction product of both di- and polyhydric alcohols and a dicarboxylic acid or its ester (generally an ester of iso or terephthalic acid) or (b) formed by adding to the components included under (a) above, in linear polymer form, a cross-linking reactant such as an isocyanate of the type described above, and curing the resin with this additional reactant. More briefly, they may be described as thermosetting polyester or modified polyester resins of the dihydric alcohol-polyhydric alcohol-dicarboxylic acid type.

While having improved properties, these and other thermosetting polyester resins previously required a high curing temperature and a substantial time for cure. This means high oven temperatures and long residence time, requiring long heating chambers and relatively slow lineal speeds of the coated wire through the heating chamber where the insulating coating is to be cured. Commercially, assuming a fixed size of oven and a fixed oven temperature, any increase in the curing rate means a proportionate increase in the rate at which the insulated wire or conductor can be produced. It is therefore very desirable to find means for reducing the "curing time" (the combination of time and temperature). Efforts have been made to reduce this "curing time" by the addition of metallic catalysts and other agents. However, only minor reductions in curing time are thus obtained and always at the expense of important physical, chemical or thermal properties of the insulation.

According to the present invention, the curing time of thermosetting polyester resins for insulation of electrical conductors is unexpectedly reduced substantially without sacrifice of any of such properties by the addition in combination to the coating solution, prior to cure, of (1) an organic titanium ester and (2) an amino aldehyde resin.

Moreover, these two additives in combination give unexpected improvements in the physical properties of the cured insulation, that is, better adhesion, better abrasion and cut-through resistance, better heat shock and solvent shock resistance, higher dielectric strength and improved hydrolytic stability.

The "organic titanium ester" (which term is used herein in the specification and claims to include any of the following defined titanium esters) capable of use in this invention may be any organic titanium ester in which the titanium is bonded to at least two groups, represented as —O—R and —O—R', in which each of R and R' is an organic radical having less than 16 carbon atoms. Each

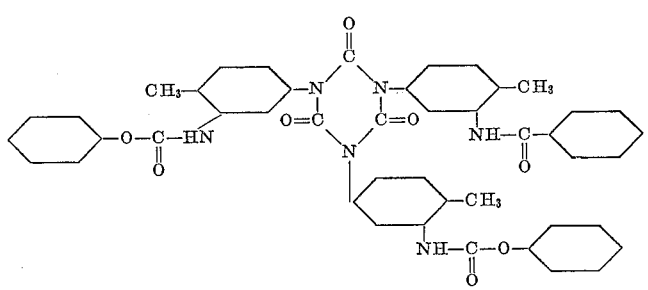

of the two organic radicals R and R' preferably is a lower alkyl, a phenyl or a lower alkyl substituted phenyl group. Each of the other two radicals bonded to the titanium preferably is also a lower alkoxy, a phenoxy or lower alkyl substituted phenoxy group, but each may be a hydroxy, a lower alkyl, a lower acyl, or a lower acyloxy group, a hydroxy substituted lower alkoxy group (corresponding to a glycol) or an aromatic group (other than those previously mentioned), which may be alkyl substituted and/or hydroxy substituted. The particular titanium ester selected should not be so reactive as to precure the coating solution and it should be compatible with that solution. These characteristics may be determined from visual observation after addition of the titanium ester to the coating solution. In addition, those substituents of the titanium ester which are liberated during curing should in general be capable of being driven off during cure in order not to detract from the properties of the cured insulation. Also the titanium ester should not contain radicals which will produce compunds otherwise detracting from the cured insulation. For example, a titanium ester which contains chlorine or other halide is generally undesirable if it will liberate a hydrogen halide during cure as this will detract from the electrical and thermal properties of the cured insulation. A titanium ester which is particularly useful in the practice of this invention is a cresol derivative of tetrabutyl titanate, which may be prepared by refluxing for one-half hour 20 parts by weight of tetrabutyl titanate with 80 parts by weight of commercial cresol (cresylic acid) having a boiling range of from 185° to 230° C. Tetra octylene glycol titanate, or tetraisopropyl titanate reacted with phenols or cresols, may be used, although to less advantage.

While any amino aldehyde resin may be used in this invention, we prefer an alkylated derivative of the condensation product of melamine and formaldehyde such as "Resimene 882" a product of the Monsanto Chemical Company, which is described in its bulletin No. 1058. It is supplied as a 66% solids solution in xylene. An alkylated condensation product of urea and formaldehyde may also be used, although to less advantage.

Based on the weight of the polyester resin to be cured, the percentage by weight of organic titanium ester, expressed as tetrabutyl titanate, should be from about 1 to 6%, and preferably around 2%, and the percentage by weight of the amino aldehyde resin used should be from about 2 to 15%, and preferably around 5%. The organic titanium ester and amino aldehyde resin may be added to the coating solution at any time prior to curing of the wire insulation.

A polyester which is particularly suitable for curing by the use of this invention is Multron F-72 (a product of Mobay Chemical Company) which is made from approximately 47 parts terephthalic acid, 36 parts glycol and 17 parts glycerine, on a mole-percentage basis.

The following examples further illustrate the invention.

*Example 1*

| | Percent by weight |
|---|---|
| Mondur SH | 4.0 |
| Multron F-72 | 25.0 |
| 882 Resimene | 2.0 |
| Tetrabutyl titanate (20% solution in cresylic acid) | 2.5 |
| Cresylic acid | 43.1 |
| Solvesso 100 | 23.4 |

Mondur SH, a blocked isocyanate, has been previously described. The cresylic acid is commercial cresol having a boiling range of 180° to 230° C. Solvesso 100 is a solvent naphtha, a hydrogenated petroleum solvent of high aromatic value. In preparing the resinous coating solution, the solvents and the F-72 resin were weighed out and the mixture heated to about 100° C. with constant stirring for thirty minutes during which water-containing vapor was allowed to escape. The Mondur SH was added gradually with constant stirring at a temperature of about 100° C. The vessel was then closed and in about thirty minutes the SH was completely dissolved. The varnish was then cooled to about 80° F. and the Resimene and titanate were added. The varnish was then filtered. It contained 30.5% solids and had a viscosity of 300 to 450 cps. at 86° F. It can then be coated and cured on the wire by following conventional wire-enamelling procedures using wiping dies and a maximum oven temperature of 700 to 750° F. Use of the combination of titanate and the formaldehyde resin will reduce the time required for curing by 30–35%, resulting in a corresponding increase in the rate of production of the insulated wire. The insulation will also have the improved properties previously described.

The improvement in the curing time of isocyanate modified thermosetting polyester resins is also shown by the following Examples 2–7, and the improvement in the curing time of thermosetting polyester resins (without isocyanate modification) is shown by Examples 8–10. In each example, all parts are by weight.

*Example 2*

232 parts of F-72 resin are dissolved in a solvent consisting of 461 parts of cresylic acid and 233 parts of Solvesso 100 along with 68 parts of Mondur SH. After solution is complete, 5.6 parts of zinc octoate drier containing 8% by weight of zinc metal are added. The resultant wire enamel contains 30% solids and has a viscosity of 425 centipoises when measured at 30° C. When applied to #18 AWG copper wire, using wiping dies with six applications of enamel and a cure following each application, and using 21 foot baking chamber having temperatures of 415, 610 and 730° F. at three points in the oven and a lineal speed of 25 feet per minute through the oven or baking chamber, the resulting coating will withstand 15 minutes immersion in acetone held at 25° C. without softening. Coating at 28 feet per minute resulted in improperly cured insulation. The insulation had a slit twist value of 44, a flexibility value of 40%–1×, a heat shock value of 0–10%/3× and a solvent shock value of 0–10%/3×.

*Example 3*

To 1,000 parts of the enamel of Example 2 are added 30 parts of a titanate ester prepared by heating under reflux, for 30 minutes, 6 parts of tetrabutyl titanate together with 24 parts of cresylic acid. The resultant enamel contains approximately 30% solids and has a viscosity of approximately 425 centipoises. When applied to #18 AWG copper wire under conditions substantially the same as in Example 2, it was found that this enamel could be coated and cured at a lineal speed of 31 feet per minute and still withstand 15 minutes in acetone without softening. The slit twist value was 41, the flexibility value was 37%/1×, the solvent shock value was 10–20%/3× and the heat shock value was 10–15%/3×.

*Example 4*

To 1,000 parts of the enamel of Example 2 are added 18.6 parts of Resimene 882. The resultant enamel contains approximately 30% solids and has a viscosity of 360 centipoises at 30° C. When applied to #18 AWG copper wire under conditions essentially the same as for Example 2, it was found that solvent resistance could be obtained at a lineal speed of 30 feet a minute but not at higher speeds. At 30 feet a minute, the insulation would withstand 15 minutes in acetone. The insulation had a slit twist value of 58, a solvent shock value of 10–20%/3×, a heat shock value of 10–20%/3× and a constant pressure cut-through value of 331°C.

Example 5

750 parts of F-72 resin are dissolved in a solvent consisting of 1295 parts cresylic acid and 700 parts Solvesso 100, along with 120 parts of Mondur SH. After solution is complete, 120 parts of Resimene 882 are added. The finished wire enamel contains 30.3% solids and has a viscosity of 330 centipoises when measured at 30° C.

When applied to magnet wire under conditions substantially the same as for Example 2, except the zone temperatures are 450, 635 and 745° F., it was found that solvent resistance could not be obtained even at a lineal speed of 23 feet per minute through the oven. With that speed, the insulation was softened after 15 minutes in acetone. The insulation had a slit twist value of 61, a solvent shock value of 10–20%/3×, a heat shock value of 0–10%/3× and a constant pressure cut through value of 329° C.

Example 6

750 parts of F-72 resin are dissolved in a solvent consisting of 1275 parts cresylic acid and 690 parts of Solvesso 100 along with 150 parts of Mondur SH. After solution is complete, 60 parts of Resimene 882 followed by 75 parts of the titanate solution of Example 3 and 150 parts of #140 high flash point mineral spirits are added. The resulting wire enamel contains approximately 30% solids and has a viscosity of 320 centipoises when measured at 30° C.

When applied to #18 AWG copper wire under conditions substantially the same as for Example 2, except at a lineal speed of 33.5 feet per minute through the oven, the resultant coating will withstand 15 minutes immersion in acetone held at 25° C. without softening.

The insulated magnet wire has a slit twist value of 59, a flexibility value of 34%–1×, a heat shock value of 10–20%/3×, a solvent shock value of 10–20%/3× and a cut-through value of 327° C. Besides the substantial reduction in curing time, the slit twist value has been increased approximately 25% and the wire may be elongated 100% more before heat shock or solvent shock occurs.

Example 7

750 parts of F-72 are dissolved in a solvent consisting of 1295 parts cresylic acid and 700 parts of Solvesso 100 along with 120 parts of Mondur SH. After solution is complete, 60 parts of Resimene 882 followed by 75 parts of the titanate solution of Example 3 are added. The finished wire enamel contains approximately 30% solids and has a viscosity of 488 centipoises.

When applied to #18 AWG copper wire under conditions substantially the same as for Example 2, except at a lineal speed of 34 feet per minute, the resulting coating will withstand 15 minutes immersion in acetone held at 25° C. without softening. The insulated magnet wire has a slit twist value of 61, a flexibility value of 35%–1×, a heat shock value of 15–20%/3×, a solvent shock value in excess of 20%–3×, and a cut-through value of 317° C.

Example 8

250 parts of F-72 resin are dissolved in 457 parts of cresylic acid and 223 parts of Solvesso 100. After solution is complete, 60 parts of Resimene 882 are added and 20 parts of a titante solution prepared by reacting, under reflux for one hour, 20 parts of tetrabutyl titanate with 40 parts of ortho cresol and 40 parts of phenol. The resulting wire enamel contains approximately 29.4% solids and has a viscosity of approximately 300 centipoises when measured at 30° C.

When applied to #18 AWG copper wire under conditions substantially the same as for Example 2, except at a lineal speed of 33.5 feet per minute, the resultant coating will withstand 15 minutes immersion in acetone held at 25° C. without softening. It has a slit twist value of 54, a flexibility value in excess of 30%–1×, and a unidirectional scrape value of 1350.

Example 9

900 parts of F-72 resin are dissolved in 1400 parts of cresylic acid and 700 parts of Solvesso 100. After solution is complete, 180 parts of the titanate solution of Example 3 are added. The resultant wire enamel contains approximately 30.8% solids and has a viscosity of 165 centipoises when measured at 30° C. When applied to #18 AWG copper wire under conditions substantially the same as for Example 2, except at a lineal speed of 31 feet per minute, the resultant coating was found to be partially cured. It has a slit twist value of 67, a flexibility in excess of 30%–1×, and a cut-through value of 319° C. When the oven temperature was held constant and the wire speed increased to 33.5 feet per minute, the coating was found to be under-cured.

Example 10

If the solution of polyester resin of Example 9, without any addition of titanate, is applied to #18 AWG copper wire, under conditions substantially the same as for Example 2, it will be found that even at a lineal speed of 19 feet per minute, cure, as evidenced by solvent resistance, is not obtained.

An embodiment of the invention is illustrated in the accompanying drawing, in which the single illustration is a cross-sectional view of an insulated magnet wire comprising a conductor 1, such as copper wire, on which is coated a layer 2 made up of multiple coatings of the cured non-linear thermosetting polyester or modified polyester-organic titanium ester-amino aldehyde resin. Assuming a typical wire size and grade, namely, No. 18 AWG (.0403" bare) in a heavy grade (nominal .003" increase in diameter due to the insulation), the layer 2 is .0015" in thickness. The layer 2 is built up on the wire by the application thereto of multiple coatings of a resin solution, each coating being applied by the conventional method using wiping dies and being followed by curing before application of the next coating. As a result, the wire 1 is provided with a thin, uniform and continuous dielectric layer 2.

The resin solution for layer 2 may be selected from Examples 1, 6, 7 and 8 or may be any other non-linear thermosetting polyester or modified polyester, such as a polyester or modified polyester of the dihydric alcohol-polyhydric alcohol type previously described or a polyester disclosed in said Patents Nos. 2,686,739 and 2,686,740, to which there has been added an organic titanium ester and an amino aldehyde resin in accordance with this invention.

We claim:

1. Magnet wire comprising an electrical conductor, and the product of curing on said conductor a resinous solution of a mixture of a thermosetting polyester resin, an organic titanium ester and an amino aldehyde resin, said polyester resin being present in a proportion which is substantially in excess, by weight, of the combined proportions of said titanium ester and amino aldehyde resin, said cured product forming a thin, uniform and continuous dielectric layer on the conductor.

2. Magnet wire according to claim 1, in which said resins and titanium ester are present in said mixture in the ratio of about 100 parts of polyester resin, 1 to 6 parts of titanium ester and 2 to 15 parts of amino aldehyde resin, by weight.

3. Magnet wire according to claim 1, in which said resins and titanium ester are present in said mixture in the ratio of about 100 parts of polyester resin, 2 parts of titanium ester and 5 parts of amino aldehyde resin, by weight.

4. The magnet wire of claim 1 wherein said cured polyester is essentially a polyester selected from the group consisting of (a) the polyester reaction product of both di- and polyhydric alcohols and a dicarboxylic acid and (b) the modified polyester resin formed by adding to the components under (a) above, in substantially linear polymeric form, a cross-linking reactant and curing the resin with said additional reactant.

5. The magnet wire of claim 1 wherein said organic tatanium ester is a titanium ester which has bonded to the titanium at least two radicals selected from the class consisting of lower alkoxy, phenoxy and lower alkyl substituted phenoxy groups.

6. Magnet wire according to claim 1, in which said polyester resin consists essentially of the reaction product of glycerine, a glycol and a compound selected from the group consisting of terephthalic and isophthalic acids and lower alkyl esters thereof.

7. Magnet wire according to claim 1, in which said polyester resin consists essentially of the reaction product of glycerine, a glycol, a polyisocyanate and a compound selected from the group consisting of terephthalic and isophthalic acids and lower alkyl esters thereof.

8. Magnet wire according to claim 1, in which said amino aldehyde resin is a melamine formaldehyde resin.

9. Magnet wire according to claim 1, in which said amino aldehyde resin is a urea formaldehyde resin.

10. In the manufacture of magnet wire, the method which comprises coating an electrically conductive wire with a solution of a mixture of a thermosetting polyester resin, an organic titanium ester and an amino aldehyde resin, said polyester resin being present in a proportion substantially in excess, by weight, of the combined proportions of said titanium ester and amino aldehyde resin, and passing the coated wire through a heating chamber to cure said mixture to a thin, uniform and continuous dielectric layer on the wire.

11. The method of claim 10, in which said resins and titanium ester are present in said mixture in the ratio of about 100 parts of polyester resin, 1 to 6 parts of titanium ester and 2 to 15 parts of amino aldehyde resin, by weight.

12. The method of claim 10, in which said resins and titanium ester are present in said mixture in the ratio of about 100 parts of polyester resin, 2 parts of titanium ester and 5 parts of amino aldehyde resin, by weight.

13. The method of claim 10, in which said organic titanium ester is a titanium ester which has bonded to the titanium at least two radicals selected from the class consisting of lower alkoxy, phenoxy and lower alkyl substituted phenoxy groups.

14. The method of claim 10, in which said amino aldehyde resin is a melamine formaldehyde resin.

15. The method of claim 10, in which said amino aldehyde resin is a urea formaldehyde resin.

References Cited by the Examiner

UNITED STATES PATENTS

| 2,917,414 | 12/1959 | McLean | 117—232 |
| 2,936,296 | 5/1960 | Precopio et al. | 117—232 |
| 3,122,451 | 2/1964 | Bunge et al. | 117—232 |

RICHARD D. NEVIUS, *Primary Examiner.*